United States Patent [19]

Labaere et al.

[11] Patent Number: 5,717,791
[45] Date of Patent: Feb. 10, 1998

[54] IMAGE CONTRAST ENHANCING METHOD

[75] Inventors: Francis Labaere, Roeselare; Pieter Vuylsteke, Mortsel, both of Belgium

[73] Assignee: AGFA-Gevaert, Mortsel, Belgium

[21] Appl. No.: 554,918

[22] Filed: Nov. 9, 1995

[30] Foreign Application Priority Data

Nov. 10, 1994 [EP] European Pat. Off. ............. 94203271

[51] Int. Cl.$^6$ ................................................ G06K 9/36
[52] U.S. Cl. ....................... 382/274; 382/131; 382/132
[58] Field of Search ........................... 382/274, 131, 382/132, 128, 263, 266, 254, 299; 378/4, 21, 901; 395/128

[56] References Cited

U.S. PATENT DOCUMENTS

| | | | |
|---|---|---|---|
| 5,461,655 | 10/1995 | Vuylsteke et al. | 378/901 |
| 5,467,404 | 11/1995 | Vuylsteke et al. | 382/274 |
| 5,546,473 | 8/1996 | Vuylsteke et al. | 382/132 |
| 5,598,481 | 1/1997 | Nishikawa et al. | 382/132 |

*Primary Examiner*—Scott A. Rogers
*Attorney, Agent, or Firm*—Richard J. Birch

[57] ABSTRACT

A contrast enhancing processing method is disclosed that is based on a transformation of an original image into a multiresolution edge representation based on a wavelet transform. The multiresolution edge representation is modified and subsequently subjected to a reconstruction procedure. Different embodiments are disclosed that are based on different forms of the multiresolution edge representation.

17 Claims, 16 Drawing Sheets

| | | | |
|---|---|---|---|
| 1/64 | 3/64 | 3/64 | 1/64 |
| 3/64 | 9/64 | 9/64 | 3/64 |
| 3/64 | 9/64 | 9/64 | 3/64 |
| 1/64 | 3/64 | 3/64 | 1/64 |

$H_0$ – FILTER

| −2 | 2 |
|---|---|

$G_0^h$ – FILTER

| −2 |
|---|
| 2 |

$G_0^v$ – FILTER

FIG. 4B

| $\gamma$ | $\lambda_\gamma$ |
|---|---|
| 0 | 0.66 |
| 1 | 0.89 |
| 2 | 0.97 |
| 3 | 0.99 |
| 4 | 1.0 |

FIG. 4C

| 1/64 | 3/64 | 3/64 | 1/64 |
|---|---|---|---|
| 3/64 | 9/64 | 9/64 | 3/64 |
| 3/64 | 9/64 | 9/64 | 3/64 |
| 1/64 | 3/64 | 3/64 | 1/64 |

$\tilde{H}_0$ – FILTER

| 0.0078125 | 0.054685 | 0.171875 | −0.171875 | −0.054685 | −0.0078125 |
|---|---|---|---|---|---|

$K_0^h$ – FILTER

| 0.0078125 | 0.046875 | 0.1171825 | 0.65625 | 0.1171825 | 0.046875 | 0.0078125 |
|---|---|---|---|---|---|---|

$L_0^h$ – FILTER

| 0.0078125 |
|---|
| 0.054685 |
| 0.171875 |
| −0.171875 |
| −0.054685 |
| −0.0078125 |

$K_0^v$ – FILTER

| 0.0078125 |
|---|
| 0.046875 |
| 0.1171825 |
| 0.65625 |
| 0.1171825 |
| 0.046875 |
| 0.0078125 |

$L_0^v$ – FILTER

FIG. 5B

IMAGE CONTRAST ENHANCING METHOD

DESCRIPTION

1. Field of the Invention

This invention relates to a method for enhancing the contrast of a digital image. More in particular it relates to such a method for use in a medical radiographic imaging system, such as a computed radiography system or a computed tomography system.

2. Background of the Invention

In imaging systems where the final output image has to be evaluated by a human observer a problem arises when the original image as obtained from an image sensing device contains detail information at various degrees of coarseness, within a wide amplitude range. This situation may arise when the sensor has a good signal to noise ratio over a large dynamic range, which is the case with computed radiography or computed tomography. When a typical image captured by such a device, e.g. a computed radiography image of a knee is to be represented on a film hardcopy (to be viewed on a lightbox) or even worse, on a display screen, then contrast of anatomic detail must always be traded off against dynamic range. Given the limited dynamic range of the image output medium (smaller than 500:1 in case of transparent film, and smaller than 100:1 in case of CRT screen under normal viewing conditions) then the tradeoff can be stated extremely as follows:

1. if the entire dynamic range of the diagnostically meaningful signal levels is mapped onto the available output medium dynamic range, then overall contrast will be very low, and for many subtle details, contrast will be below the perceptual threshold level, hence these will be missed by the observer.
2. if at the other hand only a part of the original dynamic range is mapped onto the output medium dynamic range then all signal levels below this range will all be mapped onto the same (low) output level and all original levels exceeding this range will be mapped onto the same (high) output level. In that case only those image pixels having a level within the selected dynamic range will be presented with acceptable contrast, while the other pixels will have uniform brightness, and will show up with no contrast at all.

In image workstations connected to a computed radiography or computed tomography system the desired compromise between both extreme mappings is interactively selectable, a feature which is commonly referred to as window/level setting.

However in common working environments such as a hospital there is no time for selecting the optimal window/level compromise, so the question is very urgent to display a single image on film or monitor screen, which reveals all the relevant diagnostic details with an acceptable contrast over the whole dynamic range.

This problem is largely recognized in the field of digital radiology, see: Maack I., Neitzel U., "Optimized Image Processing for Routine Digital Radiography", Proceedings International Symposium CAR '91, p. 109, Springer Verlag.

Many attempts have been made to solve this problem, such as the commonly known technique of unsharp masking, adaptive histogram equalisation, and the many variants on these generic methods, but all suffer to some extent from the shortcoming that ghost details, called artifacts are created in the vicinity of significant signal level transitions, which occur e.g. at bone/soft tissue boundaries within the image. These artifacts cause a serious problem since they might suggest pathological evidence in a normal radiograph, or in other cases such artifacts might hide subtle lesions. The detrimental effect of these artifacts on diagnosis are well described in literature: Rehm K., Dallas W. J., "Artifact Suppression in Digital Chest Radiographs Enhanced With Adaptive Histogram Equalization", Proceedings of SPIE, vol. 1092 Medical Imaging III, pp. 294–296, 1989, International Society for Optical Engineering, Bellingham.

Another problem with these contrast enhancement methods relates to the choice of the operator size. Adapting the operator size to the specific radiologic examination case may sometimes be feasible, but in many cases diagnostic details occur at different scale levels within the same image. (even within close vicinity), in which case the results remain unsatisfactory despite fine tuning attempts.

The multiple experimental studies on optimal parameter tuning for unsharp masking confirm that this is a non-trivial problem: Prokop M., Schaefer C., Oestmann J. W., Meschede A., Reichelt S., Galansky M., "Optimal Parameters for Unsharp Mask Filtering in Digital Chest Radiographs", proceedings International Symposium CAR '91, pp. 149–154, Springer Verlag.

A contrast amplification method embedded in a pyramidal multiresolution representation of an image is the solution to the operator choice problem. According to this concept the original image is decomposed into a weighted pixelwise sum of predetermined basis images, each representing image detail at a specific position within the original image, and at a specific scale. The decomposed image is completely represented by its transform coefficients, which are the weights in the above sum. Each weight specifies the contribution of the corresponding basis image in the original image. Contrast enhancement is achieved by non-linear amplification of the transform coefficients, and subsequent reconstruction. The reconstruction is the inverse process of the decomposition; if it is applied to the transform coefficients without modification, then the original image (or a close approximation thereof, depending on the kind of transform) will result. Such a method has been described in the European patent application EP 527,525.

It is implicitly assumed that these basis functions are more or less matched to what a human observer perceives as individual image primitives, such as edges, blobs, textures and more complex structures. Due to the arbitrary shape and position of image primitives the matching between basis function and image detail can be poor. This lack of accurate matching between basis images and perceptual image primitives is not critical as long as the amount of non-linear amplification is applied moderately, but the risk of introducing visible distortions grow as the enhancement technique is applied to an exaggerated degree.

In the field of digital image processing a translation invariant representation has evolved, which is based on local gradient information on several scales. The maxima of the local gradient correspond to the points of sharp variations in the image and are generally located at the boundaries of important image structures. A key advantage of this representation is the immediate access to meaningful image features. The basic concepts and properties of multiscale edges are presented in: Mallat S., Zhong S., "Characterization of Signals from Multiscale Edges", IEEE Trans. on Pattern Analysis and Machine Intelligence, vol. 14, no. 7, Jul. 1992. These representations are useful for a wide range of applications, e.g. texture discrimination, edge detection and image compression. Image quality enhancement has not been described.

SUMMARY OF THE INVENTION

Objects of the Invention

It is a principal object of the present invention to provide a method for improving contrast of a digital image.

It is a further object of the present invention to provide such a method for application in medical imaging, for example in a medical radiographic imaging system such as a computed radiography system or a computed tomography system.

It is a still further object to overcome the drawbacks of prior art methods.

Further objects will become apparent from the description hereafter.

Statement of the Invention

The objects of the present invention are achieved by a method of enhancing the contrast of an original image by processing said image, said processing comprising the steps of 1) transforming the original image into a multi-resolution edge representation comprising wavelet maxima at multiple resolution levels and a residual image,
each wavelet maximum being associated with an edge in the original image, and having a value that is proportional to the maximal edge slope at a specific resolution level and the residual image being an approximation of the original image at a low resolution level,
2) for each wavelet maximum at the highest of said resolution levels determining a wavelet maxima curve comprising wavelet maxima at subsequent lower resolution levels that correspond to the same edge in the original image,
3) modifying the wavelet maxima of each wavelet maxima curve by multiplying said wavelet maxima with a factor 'af' that depends on the average value of the values of the wavelet maxima of said maxima curve,
said dependence being such that if a wavelet maxima curve with larger average wavelet maximum yields a factor $af_1$, and a wavelet maxima curve with smaller average wavelet maximum yields a factor $af_2$, then $af_1 \leq af_2$
4) computing a processed image by applying an inverse procedure to the residual image and the modified wavelet maxima, the inverse procedure being such that if it is applied to the residual image and the unmodified wavelet maxima, then the original image or a close approximation thereof will result.

In this first embodiment the multiresolution edge representation is preferably obtained by 1) decomposing the original image into a weighted sum of wavelet basis functions at multiple resolution levels and in multiple directions and a residual image so as to yield wavelet coefficients and a residual image,
each wavelet coefficient being proportional to the edge slope in a specific direction determined at a specific resolution level, and the residual image being an approximation of the original image at a low resolution level,
2) for each resolution level determining wavelet maxima as the locations in the multiresolution edge representation where the modulus of the corresponding wavelet coefficients is locally maximal, and determining wavelet maxima as the modulus values at these positions.

In an alternative embodiment the objects of this invention are also achieved by a method of enhancing the contrast of an original image by processing said image, said processing comprising the steps of 1) transforming the original image into a multiresolution edge representation, comprising wavelet coefficients at multiple resolution levels and in multiple directions and a residual image, each wavelet coefficient being associated with an edge pixel in the original image, and having a value that is proportional to the edge slope in a specific direction determined at a specific resolution level and the residual image being an approximation of the original image at a low resolution level,
2) for each resolution level determining wavelet maxima as the locations in the multi-resolution edge representation where the modulus of the corresponding wavelet coefficients is locally maximal,
3) for each wavelet maximum at the highest of said resolution levels determining an initial wavelet maxima cluster, said initial wavelet maxima cluster comprising wavelet maxima at subsequent lower resolution levels, that correspond to the same edge in the original image,
4) extending said initial wavelet maxima clusters at each resolution level by assigning each location of said multiresolution edge representation to an initial wavelet maxima cluster,
5) modifying the wavelet coefficients of said multiresolution edge representation by multiplication with a factor 'af' which depends on the average of the wavelet maxima of the corresponding wavelet maxima cluster,
wherein the dependence is such that if a wavelet maxima cluster with larger average wavelet maximum yields a factor $af_1$, and a wavelet maxima cluster with smaller average wavelet maximum yields a factor $af_2$, then $af_1 \leq af_2$,
6) computing the processed image by applying an inverse transform to the residual image and the modified wavelet coefficients, the inverse transform being such that if it is applied to the residual image and the unmodified wavelet coefficients, then the original image or a close approximation thereof will result.

In this second embodiment the transformation is preferably performed by 1) applying one-dimensional high-pass filters independently to the rows and the columns of the original image and a two-dimensional low-pass filter to the original image, the former filters yielding horizontal and vertical wavelet coefficients respectively at the highest resolution level, and the latter filter yielding an approximation of the original image at the highest resolution level,
2) identifying the above operations as the first step of an iteration loop, and performing additional iterations using the approximation image resulting from the previous iteration instead of the original image, where the pass-through frequency of the high-pass filters and the cut-off frequency of the low-pass filter are reduced at each iteration, yielding wavelet coefficients and an approximation of the original image at subsequent lower resolution levels, and wherein said residual image is the result of the low-pass filter after the last iteration.

In the context of this application the expression 'average' is not meant to be restricted to the mathematical definition of 'average value' as the sum of a number of values divided by that number. It is meant to cover other values indicative of the average value such as the median etc.

In one aspect the present invention is based on the knowledge that the wavelet modulus maximum at a specific resolution level is proportional to the maximal slope of the edge in the approximation image at that specific resolution level. The approximation image at a specific resolution level in the image is obtained by applying the inverse reconstruction procedure up to that resolution level.

Further details concerning this knowledge can be found in the article by Mallat mentioned before.

The methods of the present invention are applicable for enhancing the contrast of a wide range of images. They were however specifically designed for application to a medical image such as an image obtained in a computed radiography system or in a computed tomography system.

In a particular embodiment an X-ray image was stored in a photostimulable phosphor screen. The image was then read out by scanning said screen with stimulating radiation, detecting the light emitted upon stimulation and converting the detected light into an electronic (digital) representation.

Next, the digital representation of the image was subjected to one of the processing methods of the present invention described higher so as to obtain a digital representation of an image having enhanced contrast.

The digital representation of the enhanced image was then used for controlling generation of density values in a hard copy or a soft copy visible representation of the X-ray image.

BRIEF DESCRIPTION OF THE DRAWINGS

Further details relating to different embodiments of the contrast enhancing method are described hereafter with reference to the drawings wherein FIG. 4b shows the filter coefficients used in the wavelet transform, FIG. 4c shows correction factors, FIG. 5b shows filter coefficients for the lowpass filter $H_0$ and the filters $K_{h0}$, $K_{v0}$ and $L_{h0}$, $L_{v0}$.

DETAILED DESCRIPTION

Figure 1:
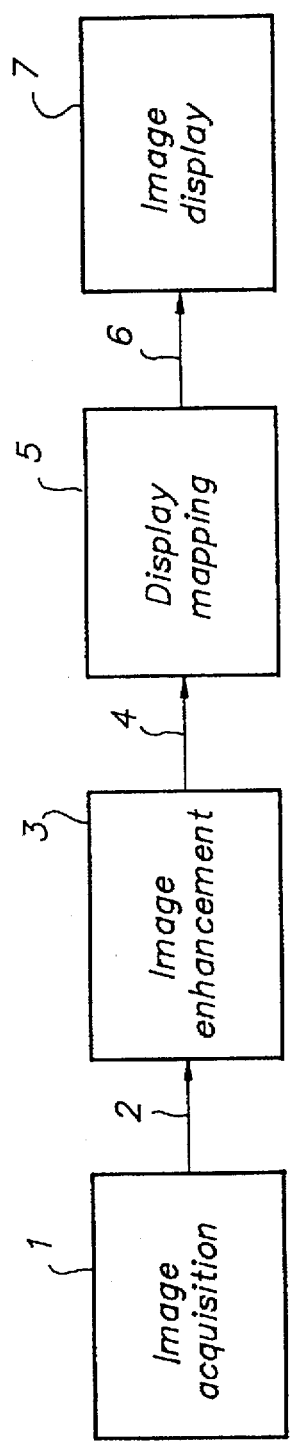
FIG. 1 is a block scheme generally illustrating an apparatus according to the present invention.

A simplified block diagram of a system wherein the method of the present invention can be applied, is shown in FIG. 1.

An image acquisition unit 1 acquires a digital image by sampling the output signal of an image sensor, such as a CCD sensor, a video camera, or an image scanner, an image intensifying tube, quantizes it using an A/D convertor into an array of pixel values, called raw or original image 2, with pixel values typically 8 to 12 bits long. Next it temporarily stores the pixel values in memory if desired, and transmits the digital image 2 to a digital computer, in the following referred to as an image enhancement unit 3, where the image contrast is adaptively enhanced in accordance with the present invention. Then, the enhanced image 4 is transmitted to the display mapping section 5 which modifies the pixel values according to a contrast curve, such that the relevant image information is presented in an optimal way, when the processed image 6 is visualised on an image output device 7, which produces either a hardcopy on transparent film or on paper, or a viewable image on a display screen (CRT).

Modification of pixel values according to a mapping curve is known in the art and is for example described in extenso in the following European applications EP 546 600 and EP 549 009.

Figure 2:
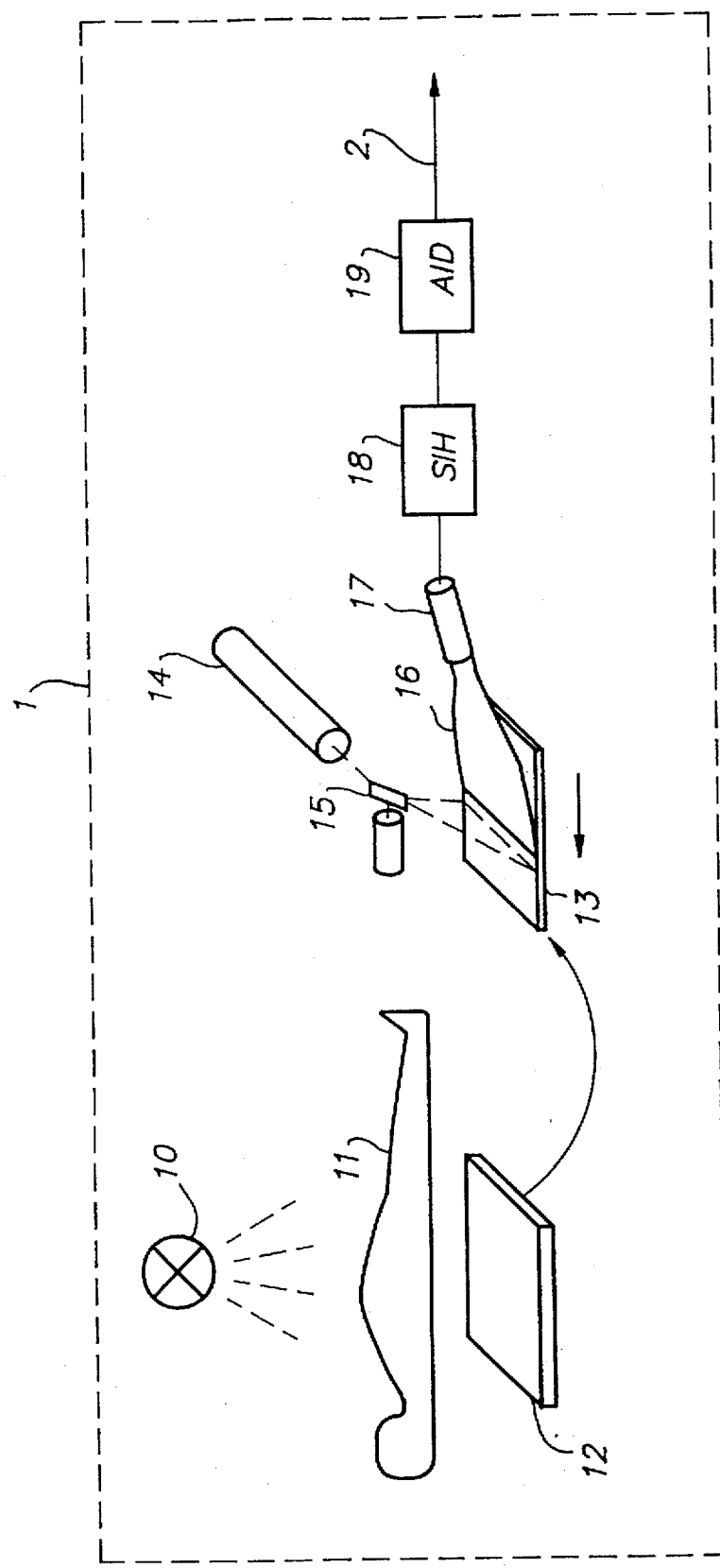
FIG. 2 is specific embodiment of an image acquisition apparatus.

A preferred embodiment of image acquisition unit 1 is shown in FIG. 2. A radiation image of an object 11 or part thereof, e.g. a patient is recorded onto a photostimulable phosphor screen by exposing said screen to X-rays originating from an X-ray source 10, transmitted through the object. Suitable photostimulable phosphors are described in European patent application 503.702 published 16.09.92.

The photostimulable phosphor screen 13 is conveyed in a cassette 12. In a radiation image readout apparatus the latent image stored in the photostimulable phosphor screen is read out by scanning the phosphor screen with stimulating rays of the appropriate wavelength (i.e. adapted to the stimulation wavelength range of the phosphor) emitted by a laser 14. The stimulating rays are deflected according to the main scanning direction by means of a galvanometric deflection device 15. The secondary scanning motion is performed by transporting the phosphor screen in the direction perpendicular to the scanning direction. A light collector 16 directs the light obtained by stimulated emission onto a photomultiplier 17 where it is converted into an electrical signal, which is next sampled by a sample and hold circuit 18, and converted into a 12 bit digital signal by means of an analog to digital converter 19. From there the digital image 2, called raw or original image, is sent to the enhancement section 3.

Figure 3:
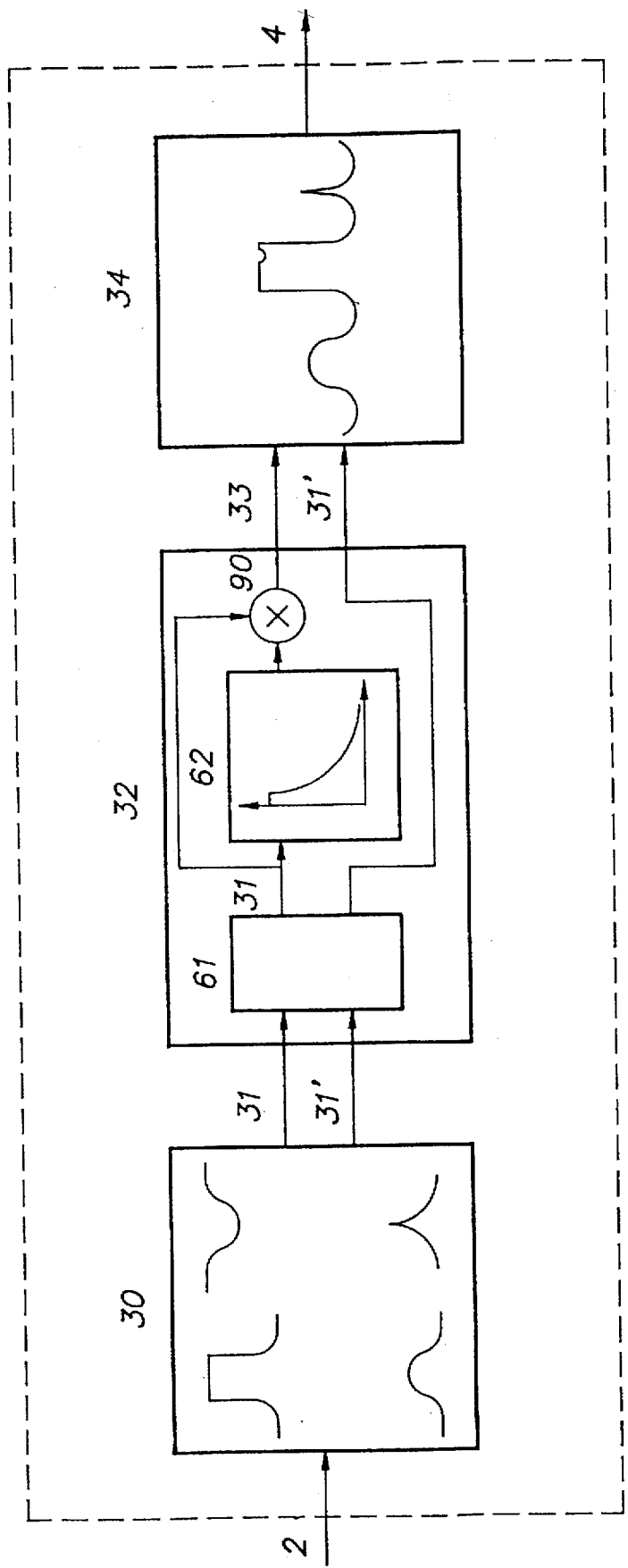
FIG. 3 is a block scheme illustrating the different steps of the contrast enhancing method.

The image enhancement section consists of three main parts, schematically drawn in FIG. 3. In a decomposition section 30 the original image 2 is decomposed into the image primitive components. A residual image 31' may be left. In modification section 32 the image primitives are modified by multiplication by a data-dependent amplification factor. In the image reconstruction section 34 the modified image primitives are next accumulated along with the residual image to compute the enhanced image.

Figure 4A:
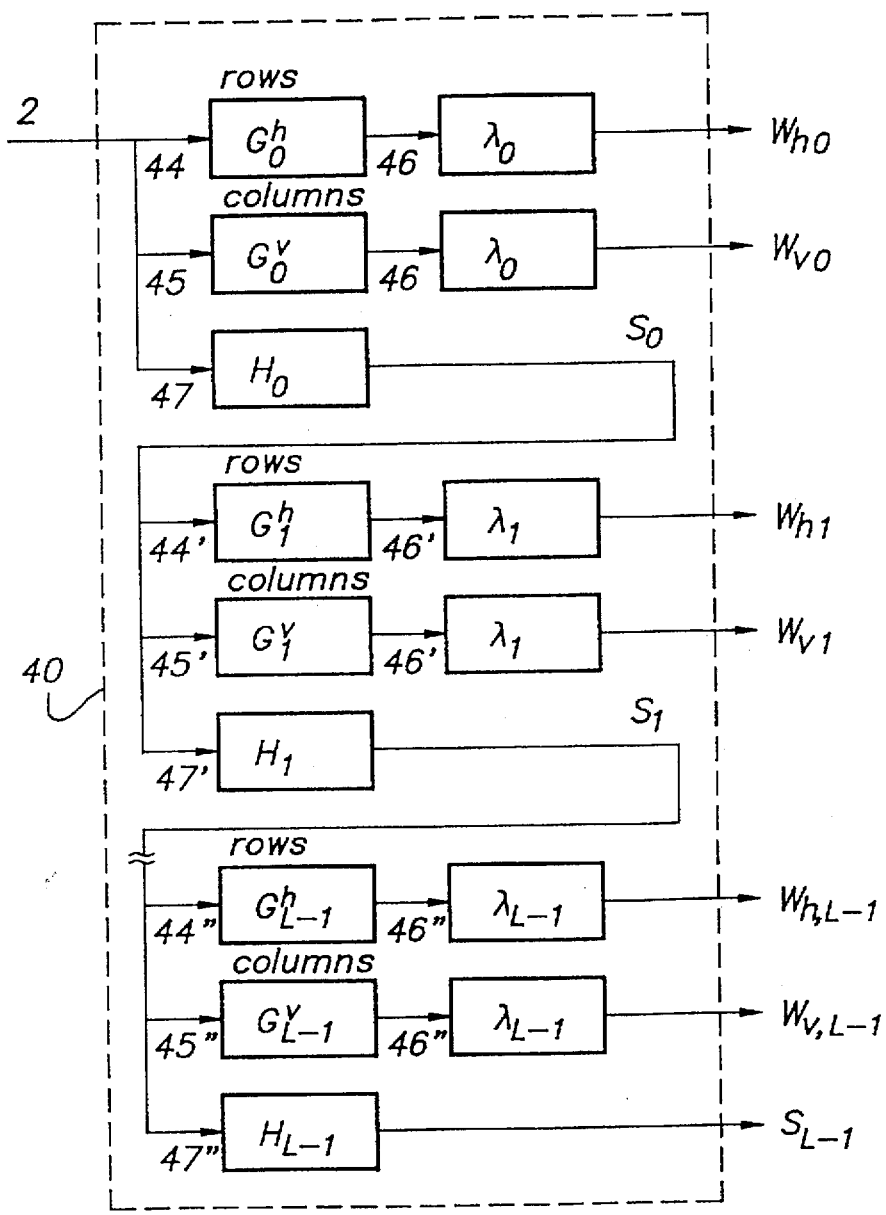
FIG. 4a is an embodiment of the wavelet transform.

The image enhancement system is based on the wavelet transform and inverse wavelet transform. A preferred embodiment of the wavelet transform is depicted in FIG. 4a.

The original image 2 is filtered by means of a lowpass filter 47, yielding a low resolution approximation $S_0$ of the original image. The gradient image $W_{h0}$ at the finest level contains the vertical edges and is obtained by filtering the original image by means of a highpass filter 44 along the rows, corrected by multiplication with the correction factor $\lambda_0$. The wavelet coefficients of the gradient image $W_{h0}$ are proportional to the edge slope in the horizontal direction in the original image. The gradient image $W_{v0}$ at the finest level contains the horizontal edges and is obtained by filtering the original image by means of a highpass filter 45 along the columns, corrected by multiplication with the correction factor $\lambda_0$. The wavelet coefficients of the gradient image $W_{v0}$ are proportional to the edge slope in the vertical direction in the original image. The same process is repeated on the low resolution approximation $S_0$ instead of the original image 2 using filter 47' and filters 44' and 45'. The result is an approximation of still lower resolution $S_1$, and gradient images $W_{h1}$ and $W_{v1}$. The wavelet coefficients of the gradient image $W_{h1}$ are proportional to the edge slope in the horizontal direction in the approximation image $S_0$, while the wavelet coefficients of the gradient image $W_{v1}$ are proportional to the edge slope in the vertical direction in the approximation image $S_0$.

A sequence of gradient images $W_{hi}$ and $W_{vi}$, i=0...L−1 and a residual low resolution approximation $S_{L-1}$ are obtained by iterating the above process L times, using filters $H_i$ and filters $G_i^h$ and $G_i^v$.

In a preferred embodiment the bandwidth of the cascaded filters $(\Pi_i H_i)$ and $(\Pi_i H_i)G_i^h$, $(\Pi_i H_i)G_i^c$ is decreased by a factor of 2 at every iteration, but other factors can also be considered. A set of cascaded lowpass filters $(\Pi_i H_i)$ and bandpass filters $(\Pi_i H_i)G_i^h$ and $(\Pi_i H_i)G_i^v$ with systematic bandwidth reduction of one octave is easily derived from the filter $H_0$ resp. $G_0^h$ and $G_0^v$ at the finest resolution level by successively doubling the number of rows and/or columns of the filter coefficient kernel, inserting a zero row every other row, and/or a zero column every other column, respectively. This implementation is computationally efficient, since all multiplications with zero coefficients and subsequent additions can be omitted.

The filter coefficients for the lowpass filter $H_0$ and the highpass filters $G_0^h$ and $G_0^v$ are presented in FIG. 4b. The center tap position, i.e. the position at which the result of the convolution is written, is accentuated in the figure. The filter impulse responses correspond to a quadratic spline wavelet of compact support that is continuously differentiable. A large variety of convolution filters are suited. The main requirement is that the cascaded filters used in the decomposition have a smooth impulse response with compact support, proportional to the rate of expansion of the filters, and that the resulting transform coefficients are proportional to the local edge slope in a specific direction at a specific resolution level, and provide a representation which is at least complete; i.e. which is sufficient to reconstruct the original image by applying an inverse transform.

FIG. 4c shows the first five correction factors. For higher levels the correction factors are equal to 1.0. The correction factors are used to ensure that the wavelet coefficients are constant across scales in case of a step edge input image.

Figure 4D:
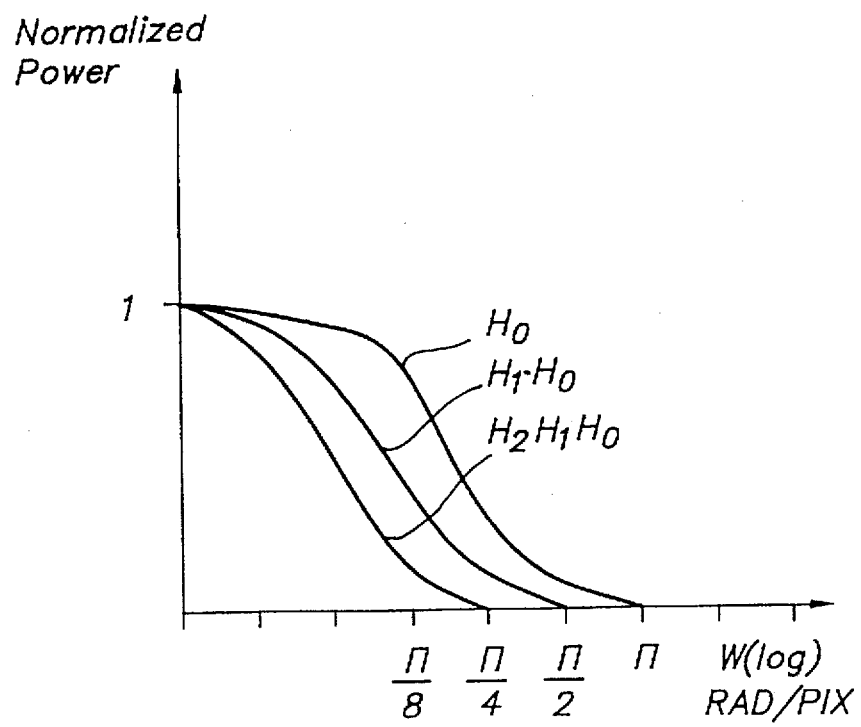
FIG. 4d shows a one-dimensional plot of the squared modulus of the transfer function of cascaded low pass filters.

FIG. 4d shows a one-dimensional plot of the squared modulus of the transfer function of the cascaded lowpass filters $(\Pi_i H_i)$. The cut-off frequency is halved for every subsequent filter. Other reduction factors, such as $\sqrt{2}$ may work as well, but the implementation is more complicated.

Figure 4E:
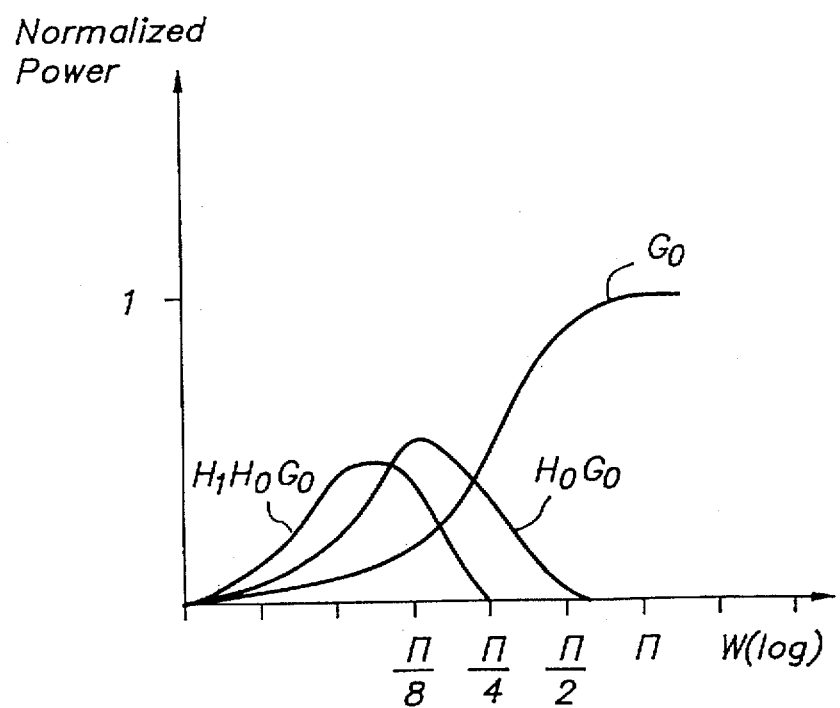
FIG. 4e shows the squared modulus of the cascaded bandpass transfer functions.

The squared modulus of the cascaded bandpass transfer functions $(\Pi_i H_i)G_i$ is shown in FIG. 4e.

Figure 5A:
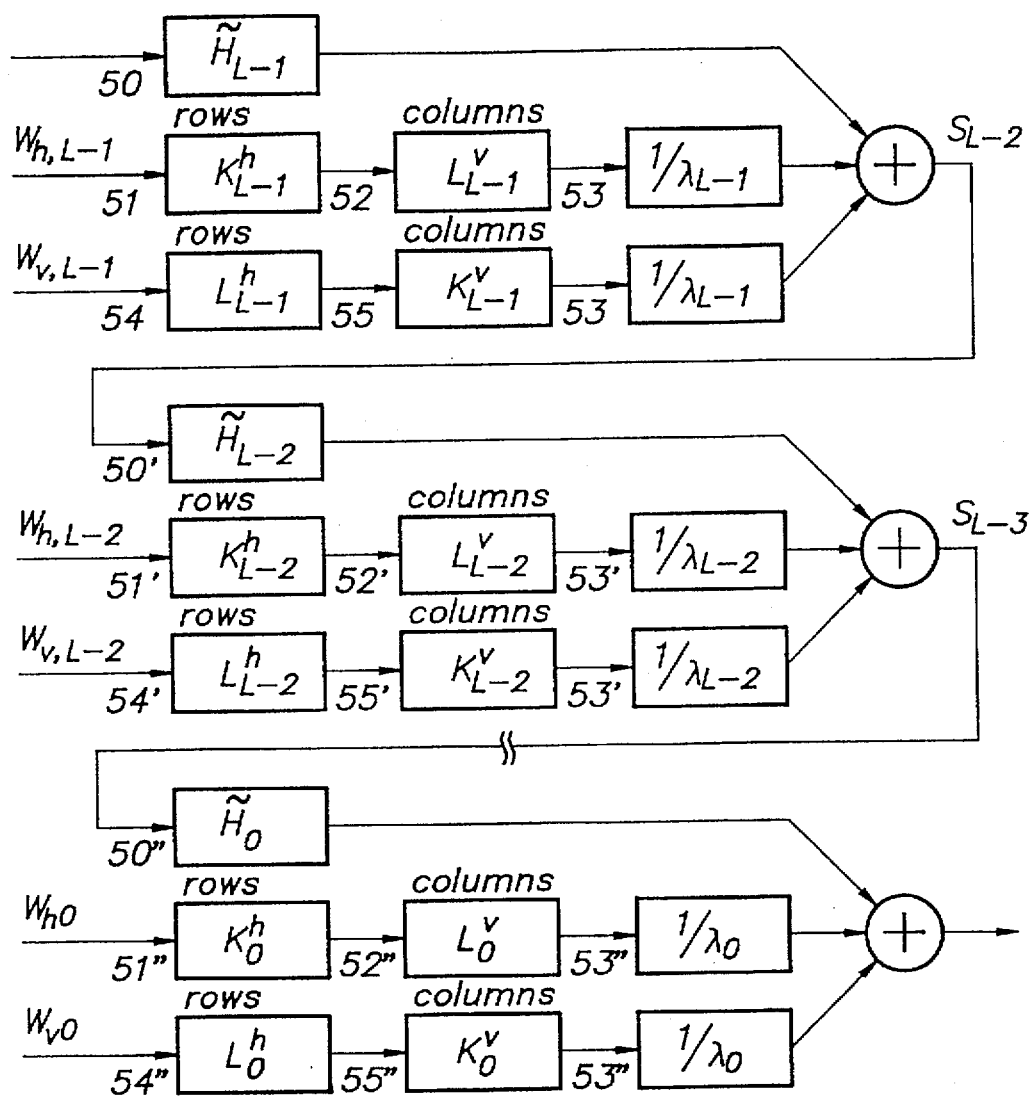
FIG. 5a is an embodiment of an inverse wavelet transform.

The embodiment of the inverse wavelet transform is depicted in FIG. 5a. The low resolution approximation image $S_{L-1}$ is filtered by means of a lowpass filter 50. The image $W_{h,L-1}$ is filtered along the rows by means of filter 51 and the resulting image is filtered along the columns by means of filter 52 and corrected with the inverse correction factor $1/\lambda_{L-1}$, while image $W_{v,L-1}$ is filtered with filter 54 along the rows and the resulting image is filtered along the columns with filter 55, and corrected with the inverse correction factor $1/\lambda_{L-1}$. The latter three filtered images are next added to yield an intermediate resolution image $S_{L-2}$.

The same process is repeated on the intermediate resolution image instead of the residual image using a lowpass filter 50' and filters 51', 52' and 54', 55' and the input images $W_{h,L-2}$ and $W_{v,L-2}$. This process is iterated L times, using the input images $W_{hi}$, $W_{vi}$ and $S_i$ at the subsequent higher resolution levels, feeding the intermediate resolution image $S_{i-1}$ to the next stage at higher resolution level.

If the filter coefficients are matched to the filter coefficients of the filters $H_i$ and the filters $G_i^h$ and $G_i^v$ of the wavelet transform, and the transform coefficients were not modified, then the intermediate resolution images are good approximations of the original image at the current level of resolution, and the resulting image is a good approximation of the original.

In a preferred embodiment the filter bandwidth is increased by a factor of 2 at every iteration, but other factors can also be considered. A set of cascaded low pass filters $(\Pi_i H_i)$ and filters $(\Pi_i H_i)K_i$ and $(\Pi_i H_i)L_i$ with systematic bandwidth reduction of one octave is easily derived from the filters $H_0$ resp. $K_0$ and $L_0$ at the finest resolution level by successively doubling the number of rows and/or columns of the filter coefficient kernel, inserting a zero row every other row, and/or a zero column every other column, respectively. This implementation is computationally efficient, since all multiplications with zero coefficients and subsequent additions can be omitted.

The filter coefficients for the lowpass filter $H_0$ and the filters $K_{h0}$, $K_{v0}$ and $L_{h0}$, $L_{v0}$ are presented in FIG. 5b. The center tap position, i.e. the position at which the result of the convolution is written, is accentuated in each figure. These coefficients are matched to the filter coefficients of the wavelet transform.

Figure 6A:
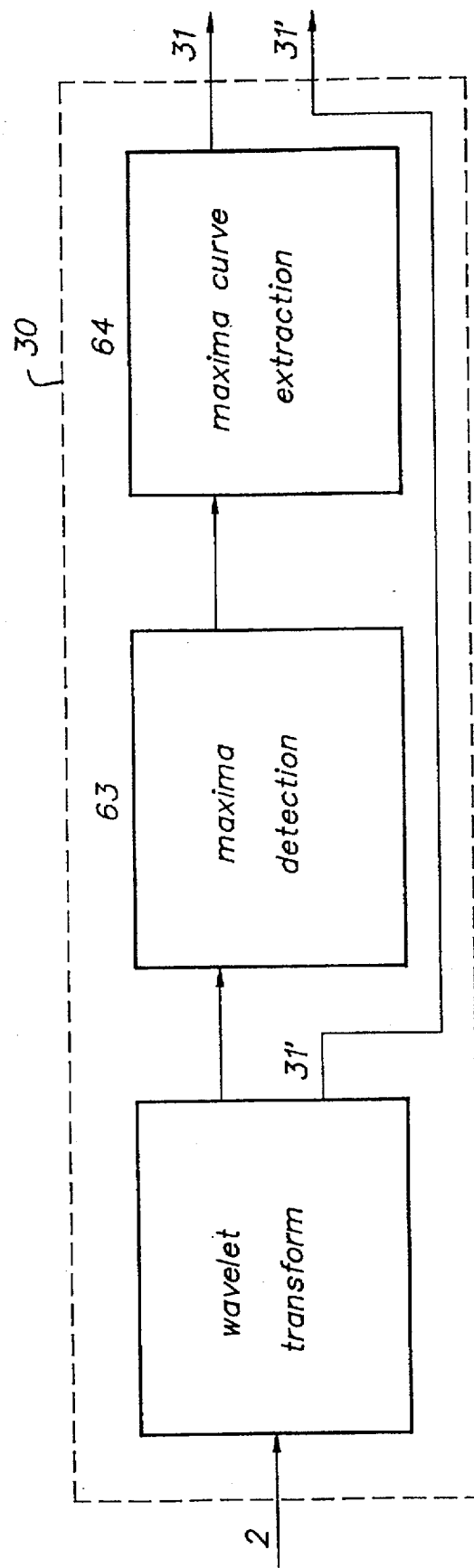
FIG. 6a is an embodiment of a decomposition process.

A first embodiment of the decomposition process 30 is depicted in FIG. 6a. It comprises three steps:

a) decomposing the image into a weighted sum of wavelet basis functions with weights proportional to the local edge slope in a specific direction determined at a specific resolution level, using the above described wavelet transform, b) detecting the wavelet maxima, c) extracting the wavelet maxima curves.

The embodiment of the maxima detection process 63 is as follows. In a first stage the modulus and angle images are computed of each pair of gradient images $W_{hi}$ and $W_{vi}$ according to the following formulae:

$$M_i(x,y) = \sqrt{W_{hi}^2(x,y) + W_{vi}^2(x,y)}$$

$$A_i(x,y) = \arctan\left(\frac{W_{vi}(x,y)}{W_{hi}(x,y)}\right)$$

with $M_i(x,y)$ the computed modulus value at the location (x,y) and $A_i(x,y)$ the corresponding angle value at the location (x,y). Then for each level i of the multiresolution representation the wavelet maxima image $m_{mi}(x,y)$ is computed by the following procedure. For each position in the wavelet maxima image the principal direction of the gradient vector in that position is determined by examination of the angle value at the corresponding position in the angle image. If the angle value is between $$\frac{-\pi}{4} \text{ and } \frac{\pi}{4}$$

or between $$\frac{3\pi}{4} \text{ and } \frac{5\pi}{4},$$

then the principal direction is horizontal, otherwise the principal direction is vertical. The modulus value at the current pixel position in the modulus image is maximal if this modulus value is larger than the values for the two neighbour pixels in the principal direction of the gradient vector at the current pixel position. If the modulus value is maximal then this modulus value is stored in the wavelet maxima image at the current pixel position, otherwise 0 is written at this position. This procedure is repeated for each position in the wavelet maxima image and for each level in the multiresolution representation.

These wavelet maxima images form a multiscale edge representation of the original image, which indicate the position and maximum slope of the edges in each image of a sequence of approximation images of the original image, at different resolution levels.

The embodiment of the maxima curve extraction process 64 is as follows.

The wavelet maxima at different resolution levels which correspond to the same edge are located at more or less equivalent positions in the corresponding wavelet maxima images. If the wavelet maxima images at subsequent lower resolution level were superimposed on top of each other starting from the finest resolution level, then the wavelet maxima corresponding to the same edges could be connected by discrete curves comprising one wavelet maximum at each resolution level, starting from the finest resolution level, up to some lower resolution level.

Sharp edges are only visible in the highest resolution approximation images, and therefore the corresponding modulus maxima curve will be short. Blurry edges on the other hand will only vanish in approximation images of much lower resolution, and therefore the corresponding wavelet maxima curve will be longer.

The wavelet maxima curves can be found with the following procedure, starting from the second finest scale. For each non-zero wavelet maximum at the second finest scale, not yet connected with the finer scale, a rectangular neighbourhood box of size three pixels in the principal direction and size one pixel in the other direction is centered at the corresponding position in the wavelet maxima image at the finer scale. In this neighbourhood box a candidate for connection with the current wavelet maximum at the coarser scale is selected. Among the non-zero wavelet maxima in this box, not yet connected with the coarser scale, with an angle value differing less than $0.4\pi$ from the angle value of the current maximum at the coarser scale, the wavelet maximum with the largest value is selected. If such a value is found, then the current wavelet maximum at the coarser scale is added to a list of candidates for connection with the selected wavelet maximum at the finer scale in the neighbourhood box. This process is repeated for all non-zero wavelet maxima at the coarser scale. Then for each list a connection is made between the wavelet maximum at the finer scale associated with that list and the largest wavelet maximum of the coarser scale present in the list, if the list is not empty. Each set of wavelet maxima connected in this way, is a wavelet maxima curve.

This process is repeated for each pair of subsequent lower resolution levels of the decomposition using neighbourhood-boxes of increasing size. In a preferred embodiment the box size is increased by a factor 2 at every subsequent lower resolution level, but other factors can also be considered. The allowed angle difference for the highest resolution level is set to $0.4\pi$, while the allowed angle difference for the subsequent higher levels is set to $0.25\pi$.

A wavelet maxima curve consists of wavelet maxima which correspond to the same edge in the original image. The average wavelet maximum, being the sum of the wavelet maxima along the curve divided by the number of maxima, is an important descriptor. A large value of the average wavelet maximum corresponds to a dominant image primitive, while a small average ravelet maximum corresponds to a subtle detail.

Referring to FIG. 3 a preferred embodiment of the modification section 32 in accordance with the findings of the present invention comprises a memory 61 for temporarily storing residual image 31' and the above computed wavelet maxima curves represented by their contributing wavelet maxima, and the corresponding average wavelet maximum, a look up table 62 for computing the amplification factor af as a function of the average wavelet maximum, and a multiplier 90 to compute the modified wavelet maxima 33 as the product of the wavelet maxima stored in memory 61 multiplied by the amplification factor af. For each maxima curve an amplification factor af is computed by means of the control function:

$$af=(x/m)^{p-1}$$

where x is the average wavelet maximum of the wavelet maxima curve and the power p is chosen within the interval $0<p<1$, preferably $0.5<p<0.9$. A comparative evaluation of a large number of computed radiography images of thorax and bones by a team of radiologists indicated that $p=0.7$ is the optimal value in most cases, m specifies the abscissa range: $0 \leq x \leq m$, e.g. $m=4095$ if the average wavelet maximum is represented by 12 bits. This control function is implemented in the above mentioned lookup table 62. A plot of the above function is presented in FIG. 7a.

When all wavelet maxima of a wavelet maxima curve are multiplied with the associated amplification factor for that curve, then the image primitives with low amplitude will be boosted relative to the image primitives that originally had good contrast. Because of the constant amplification factor for each wavelet maximum belonging to a wavelet maxima curve, the global shape of the corresponding image primitive will not be altered. In this respect the above power function proved to perform very well, but it is clear that an infinite variety of monotonically decreasing control functions can be found that will enhance subtle details.

In an alternative embodiment excessive noise amplification can be avoided by using a composite control function:

$$af=(m/x)^a*(c/m)^{q*}(x/c)^p \text{ if } 0 \leq x < c$$

$$af=(x/m)^{p-1} \text{ if } c \leq x \leq m$$

where x is the average wavelet maximum of the wavelet maxima curve and the power q is chosen within the interval $0<q<1$, preferably $0.5<q<0.9$, and most preferably $q=0.7$ (however the preferred value of q depends upon the kind of radiological examination), where the power p is not smaller than q, where the cross-over abscissa c specifies the transition point between both power functions: $0<c<m$, and preferably c is very small relative to m; and where m specifies the abscissa range: $0 \leq x \leq m$.

Figure 7A:
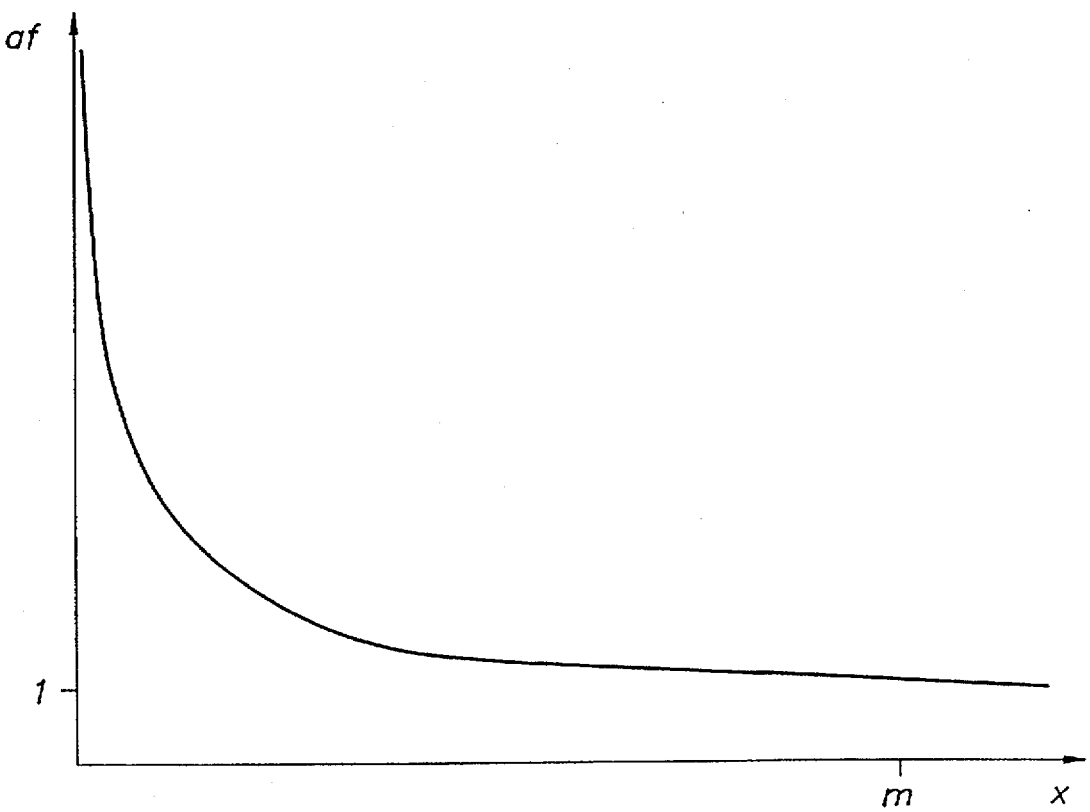
FIG. 7a is a plot of a specific control function that can be used in a method of the present invention.
Figure 7B:
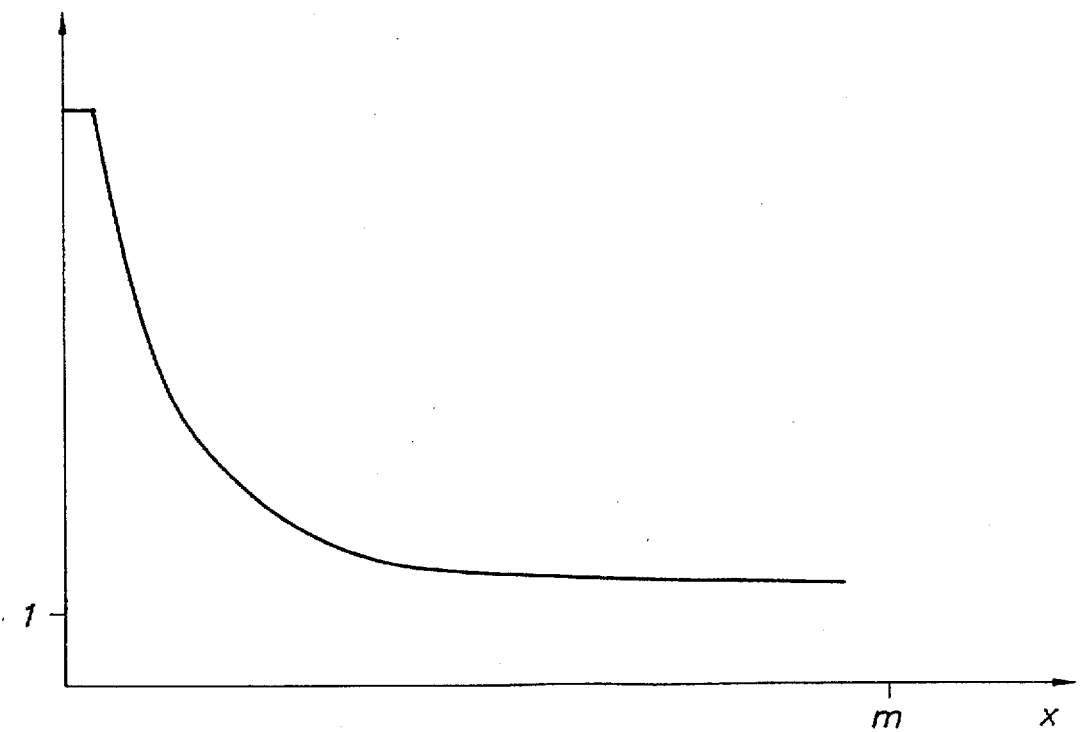
FIG. 7b is a plot of an alternative control function.

A plot of the above function is presented in FIG. 7b. Decreasing the power q will further enhance the contrast of subtle details, but at the same time the noise component will also be amplified. The noise amplification can be limited by choosing a power value p larger than q, preferably 1.0, so, that the slope of the control function is not extremely steep for the range of very small abscissae in the interval 0 . . . c. Ideally, the cross-over abscissa c should be proportional to the standard deviation of the noise component (assuming additive noise), with a proportionality factor between one and two. In that case the lowest amplitude details burried within the noise along with the majority of the noise signals will only be moderately amplified.

In this respect the above composite power function proved to perform very well, but it is clear that an infinite variety of monotonically decreasing control functions can be found that will enhance subtle details without boosting the noise to an excessive level. The main requirement is that the amplification factor af for the range of very small abscissa values is limited to an acceptable value, in order to avoid excessive amplification of noise components.

When the wavelet maxima of each wavelet maxima curve are modified according to one of the above methods, and next used as input in the reconstruction section, then the dynamic range of the resulting signal will normally exceed the original range. Therefore the resulting image signal is ultimately reduced to the dynamic range of the original signal, or even smaller. In the former case the contrast of subtle details will show improved perceptibility in comparison with the original image, in the latter case the same perceptibility level may be reached with a smaller dynamic range, in accordance with the findings of the present invention. In a preferred embodiment the above reduction of dynamic range is accomplished by means of a lookup table, which maps said reconstructed image signal to an output signal that represents the desired screen brightness or film density. The mapping is monotonic and may be linear or curved, depending on the desired gradation.

Figure 8A:
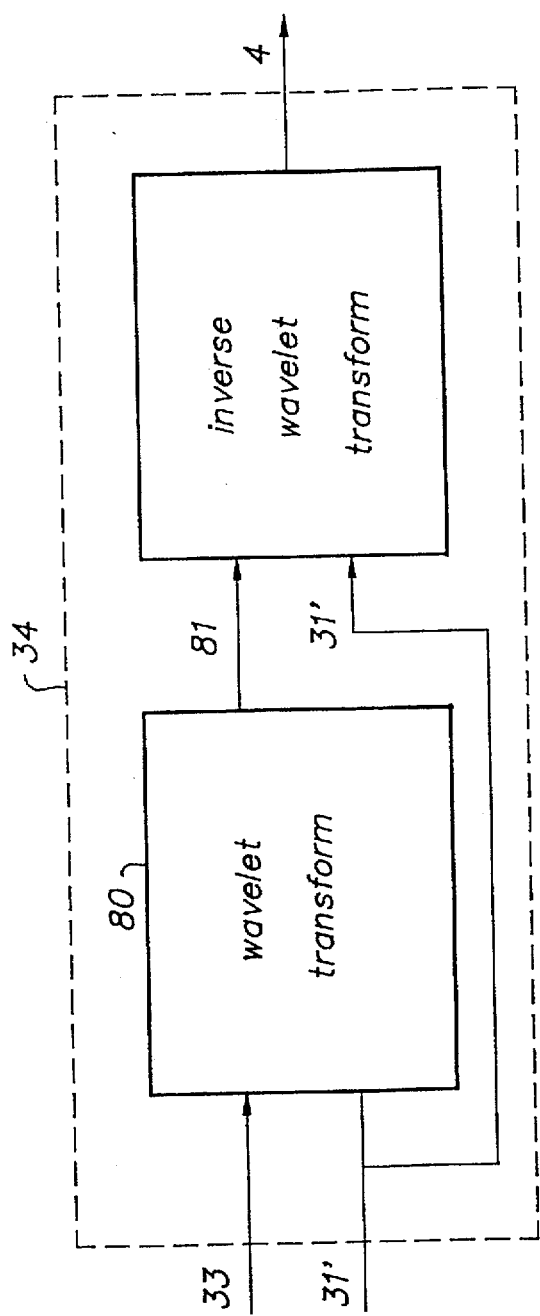
FIG. 8a is an embodiment of a reconstruction process.

The embodiment of the reconstruction of the processed image starting from its wavelet maxima representation is depicted in FIG. 8a. In a first stage the wavelet representation is reconstructed starting from the sequence of wavelet maxima images and the residual image 31'. In the final stage the inverse wavelet transform is applied to the reconstructed wavelet representation and the unmodified low resolution approximation in order to compute the enhanced image 4.

Figure 8B:
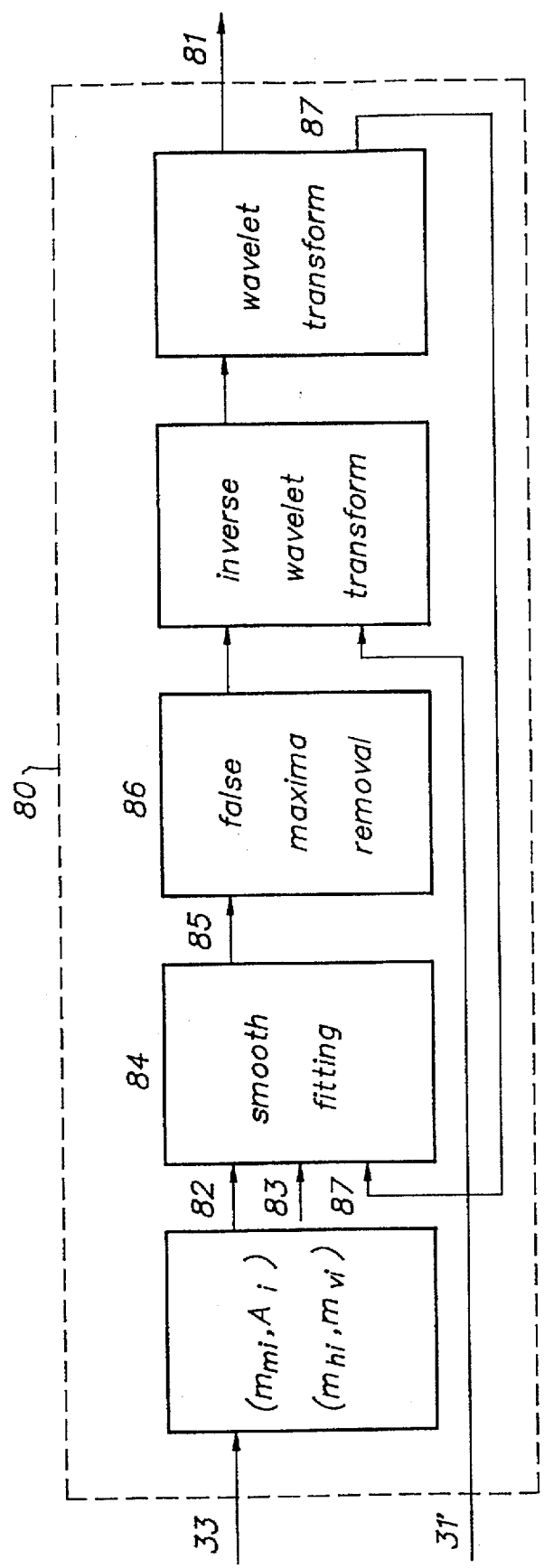
FIG. 8b is an embodiment of a wavelet reconstruction process.

The embodiment of the wavelet reconstruction process 80 is schematically drawn in FIG. 8b. First each pair of wavelet maxima image $m_{mi}$ (x,y) and angle image $A_i$(x,y) is converted into a horizontal and vertical maxima image according to the following formulae:

$$m_{hi}(x,y) = m_{mi}(x,y)\cos(A_i(x,y))$$

$$m_{vi}(x,y) = m_{mi}(x,y)\sin(A_i(x,y))$$

with $m_{hi}(x,y)$, $m_{vi}(x,y)$ the horizontal resp. the vertical component of the maximum at location (x,y).

Then an iteration process is started from an initial sequence of images 83 set to zero. The number and size of the initial images equals the number and size of the gradient images $W_{hi}$ and $W_{vi}$ used in the wavelet representation of the original image. The feedback images 87 are not used in the first iteration. For each horizontal and vertical maxima image a smooth fitting through the maxima is computed in section 84. False maxima introduced during the fitting process are next removed in section 86. The inverse wavelet transform followed by the wavelet transform produces the images 87 fed back into the fitting process 84 for the next iteration.

Figure 8C:
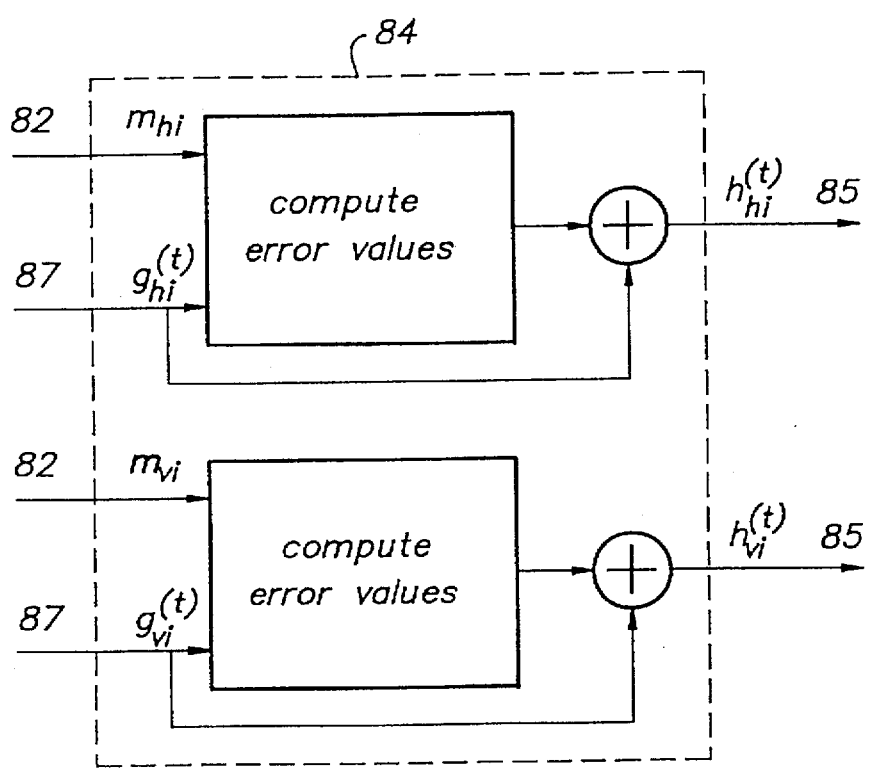
FIG. 8c is an embodiment of a smooth fitting process.

The embodiment of the smooth fitting process is depicted in FIG. 8c. For the first iteration the zero output images 83 are used, while for the subsequent iterations the feedback images 87 are used in the fitting process.

For iteration number t; $t \geq 1$; the following procedure is performed. Between each pair of consecutive non-zero maxima $m_{hi}(m,k_o)$ and $m_{hi}(m,k_n)$ of row m of the horizontal maxima image 82 at the specific level i, $0 \leq i \leq L-1$, the following error values $\epsilon_i(m,k)$ are computed with the following formulae:

$$p = k_n - k_o$$

$$\tau = 5.8^{-2^{-i}}$$

$$\epsilon_i(m,k_o) = g_{hi}^{(t)}(m,k_o) - m_{hi}(m,k_o)$$

$$\epsilon_i(m,k_n) = g_{hi}^{(t)}(m,k_n) - m_{hi}(m,k_n)$$

$$\epsilon_i(m,k) = \frac{\epsilon_i(m,k_o)}{1-\tau^{2p}} \tau^{k-k_o}(1-\tau^{2(k_n-k)}) + \frac{\epsilon_i(m,k_n)}{1-\tau^{2p}} \tau^{k_n-k}(1-\tau^{2(k-k_o)})$$

$k_o < k < k_n$.

This process is repeated for all consecutive non-zero maxima in row m and for all rows in the horizonal maxima image $m_{hi}$. The computed error values $\epsilon_i(m,k)$ for the horizontal maxima image $m_{hi}$ at level i are then added to the horizontal input image 87 $g_{hi}^{(t)}$ at the corresponding level to yield the image 85 $h_{hi}^{(t)}$. This image is a smooth fitting through the maxima of the horizontal maxima image $m_{hi}$.

Between each pair of consecutive non-zero maxima $m_{vi}(k_o,m)$ and $m_{vi}(k_n,m)$ of column m of the vertical maxima image 82 at the specific level i, $0 \leq i \leq L-1$, the following error values $\epsilon_i(k,m)$ are computed with the following formulae:

$$p = k_n - k_o$$

$$\tau = 5.8^{-2^{-i}}$$

$$\epsilon_i(k_o,m) = g_{vi}^{(t)}(k_o,m) - m_{vi}(k_o,m)$$

$$\epsilon_i(k_n,m) = g_{vi}^{(t)}(k_n,m) - m_{vi}(k_n,m)$$

$$\epsilon_i(k,m) = \frac{\epsilon_i(k_o,m)}{1-\tau^{2p}} \tau^{k-k_o}(1-\tau^{2(k_n-k)}) + \frac{\epsilon_i(k_n,m)}{1-\tau^{2p}} \tau^{k_n-k}(1-\tau^{2(k-k_o)})$$

with $k_o < k < k_n$.

This process is repeated for all consecutive non-zero maxima in column m and for all columns in the vertical maxima image $m_{vi}$. The computed error values $\epsilon_i(k,m)$ for the vertical maxima image $m_{vi}$ at level i are then added to the vertical input image 87 $g_{vi}^{(t)}$ at the corresponding level to yield the image 85 $h_{vi}^{(t)}$. This image is a smooth fitting through the maxima of the vertical maxima image $m_{vi}$.

The same process is applied to all the levels i, $0 \leq i \leq L-1$ of the representation.

False maxima introduced by the above procedure can be removed by the following maxima removal procedure. Each pair of smooth fitted images $h_{hi}$ and $h_{vi}$ are converted into a modulus fit image $h_{mi}$ and angle fit image $h_{ai}$ according to the formulas:

$$h_{mi}(x,y) = \sqrt{h_{hi}^2(x,y) + h_{vi}^2(x,y)}$$

$$h_{ai}(x,y) = \arctan\left(\frac{h_{vi}(x,y)}{h_{hi}(x,y)}\right)$$

with $h_{mi}(x,y)$ the computed modulus fit value at the location (x,y) and $h_{ai}(x,y)$ the corresponding angle fit value at the location (x,y).

For each row in the modulus fit images $h_{mi}$ the false modulus fit maxima are detected as the local modulus fit maxima with positions between the positions of 2 consecutive wavelet maxima. If a false modulus fit maximum is found, it is removed by setting the values at the left side of the position of the minimum modulus fit between the two wavelet maxima equal to the value of the left wavelet maximum, and all values at the right side of the minimum equal to the value of the right modulus maximum. This maxima removal procedure is executed only if for all positions in the angle fit image row between the positions of the 2 consecutive wavelet maxima the fitted angle value is between $$\frac{-\pi}{4} \text{ and } \frac{\pi}{4}$$

or between $$\frac{3\pi}{4} \text{ and } \frac{5\pi}{4}.$$

For each column in the modulus fit images $h_{mi}$ the false modulus fit maxima are detected as the local modulus fit maxima with positions between the positions of 2 consecutive wavelet maxima.

If a false modulus fit maximum is found, it is removed by setting the values at the upper side of the position of the minimum modulus fit between the two wavelet maxima equal to the value of the upper wavelet maximum, and all values at the bottom side of the minimum equal to the value of the bottom wavelet maximum. This maxima removal procedure is executed only if for all positions in the angle fit image column between the positions of the 2 consecutive wavelet maxima the fitted angle value is between $$\frac{\pi}{4} \text{ and } \frac{3\pi}{4}$$

or between $$-\frac{3\pi}{4} \text{ and } -\frac{\pi}{4}.$$

Then the corrected modulus fit image and angle fit image are converted into a horizontal fit image $hc_{hi}$ and vertical fit image $hc_{vi}$ for each level according to the formulas:

$$hc_{hi}(x,y) = h_{mi}(x,y)\cos[h_{ai}(x,y)]$$

$$hc_{vi}(x,y) = h_{mi}(x,y)\sin[h_{ai}(x,Y)]$$

These images and the residual image 31' are used as the input images for the inverse wavelet transform followed by the wavelet transform producing images $g_{hi}^{(t+1)}$ and $g_{vi}^{(t+1)}$ to be used in the next iteration.

This repeated procedure yields subsequent better approximations of the wavelet transform coefficients of the original image when started from the unmodified wavelet maxima. It has been found that after 20 iterations the increase of precision that is obtained by further iterations is negligible.

The final result $g_{hi}^{(T+1)}$ and $g_{vi}^{(T+1)}$ after T iterations are the reconstructed wavelet transform images 81.

Referring to FIG. 8a the inverse wavelet transform is applied to the reconstructed wavelet transform images 81 and the unmodified low resolution approximation 31' to produce the processed image 4.

Figure 9:
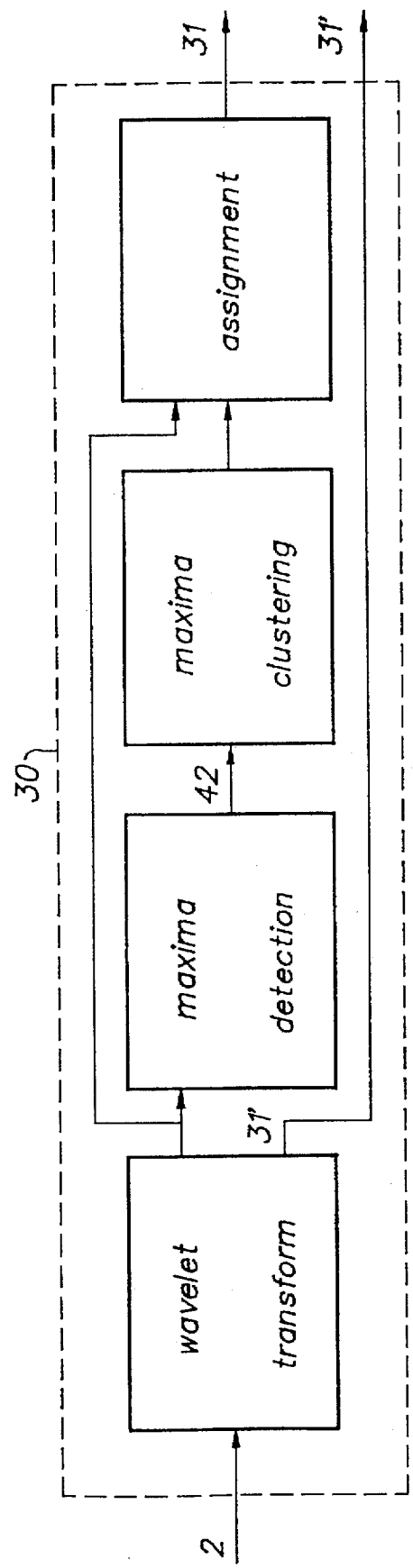
FIG. 9 is a second embodiment of a reconstruction process.

A second embodiment of the decomposition process is depicted in FIG. 9 and comprises four steps:
a) decomposing the image into a weighted sum of wavelet basis functions at multiple resolution levels, each weights being proportional to the local edge slope in a specific direction and at a specific resolution, using the above described wavelet transform,
b) detecting the wavelet maxima,
c) determining the initial wavelet maxima clusters,
d) extending the initial wavelet maxima clusters.

The first two steps are the same as in the previously described decomposition process. The initial wavelet maxima clusters can be found with the following procedure starting at the second finest scale. Each wavelet maximum is represented by its location (x,y) in the multiresolution edge representation, its horizontal and vertical wavelet coefficients $W_{hi}(x,y)$ and $W_{vi}(x,y)$, and its modulus maximum value $m_{mi}(x,y)$ which is non-zero only at the wavelet maximum positions.

For each wavelet maximum at the second finest scale, not yet connected with the finer scale, a rectangular neighbourhood box of size three pixels in the principal direction and size one pixel in the other direction is centered at the corresponding location in the wavelet maxima image at the finer scale. In this neighbourhood box a candidate for connection with the current wavelet maximum at the coarser scale is selected. Among the wavelet maxima in this box, not yet connected with the coarser scale, with an angle value differing less than $0.4\pi$ from the angle value of the current maximum at the coarser scale, the wavelet maximum with the largest modulus value is selected. If such value is found, then both the horizontal and vertical wavelet coefficient and the current wavelet maximum at the coarser scale are added to a list of candidates for connection with the selected wavelet maximum at the finer scale in the neighbourhood box. This process is repeated for all wavelet maxima at the coarser scale. Then for each list a connection is made between the wavelet maximum at the finer scale associated with that list and the largest wavelet maximum of the coarser scale present in the list, if the list is not empty.

This process is repeated for each pair of subsequent lower resolution levels of the decomposition using neighbourhood boxes of increasing size. In a preferred embodiment the box size is increased by a factor 2 at every level, but other factors can also be considered. The allowed angle difference for the highest resolution level is set to $0.4\pi$, while the allowed angle difference for the subsequent lower resolution levels is set to $0.25\pi$.

For each cluster the average wavelet maximum is computed as the sum of the modulus values of the wavelet maxima that are comprised in the initial wavelet maxima cluster, divided by the number of wavelet maxima in the cluster. This average wavelet maximum is an important descriptor. A large value of the average wavelet maximum will indicate that the cluster represents a dominant image primitive, while a small average wavelet maximum indicates a subtle detail.

The wavelet maxima clusters initially only comprise connected wavelet maxima at different resolution levels. In the next stage the initial clusters are extended with non-maxima represented by the locations (x,y) of the multiresolution edge representation where the wavelet maxima images $m_{mi}(x,y)$ are zero, and with the corresponding wavelet coefficients $W_{hi}$, $W_{vi}$, modulus values $M_i$ and angles $A_i$.

This is done at all resolution levels, in such a way that each cluster finally comprises all locations of the multiresolution edge representation that contribute to the same image feature. Each cluster will be treated as a single primitive in the modification section, so that the corresponding wavelet coefficient values can be modified in a uniform way, in order to minimize distortions in the course of reconstruction.

The assignment procedure is as follows. At each resolution level the wavelet maxima in the corresponding initial cluster are considered as point sources that generate in each multiresolution location a field with strength according to the following formula:

$$E = \frac{L_{wave}}{r-1}$$

where $L_{wave}$ is the number of wavelet maxima in the initial cluster, and r is the distance from the considered location to the location of the wavelet maximum.

Each non-maximum of the multiresolution representation is assigned to the cluster associated with the wavelet maximum that generates the largest value of the field strength E at the considered location.

It is clear that other assignment procedures exist that result into a set of clusters of in the multiresolution edge representation, each cluster representing an image primitive component.

Referring to FIG. 3 a preferred embodiment of the modification section 32 in accordance with the findings of the present invention comprises a memory 61 for temporarily storing the residual image 31' and the above computed wavelet maxima clusters and the corresponding average wavelet maximum, a look up table 62 for computing the amplification factor af as a function of average .wavelet maximum, and a multiplier 90 to compute the modified wavelet coefficients 33 as the product of the wavelet coefficients of the clusters stored in memory 61 multiplied by the amplification factor af. For each image primitive, being a wavelet maxima cluster, an amplification factor af is computed by means of the following control function:

$$af=(x/m)^{p-1}$$

where x is the average wavelet maximum of the cluster and the power p is chosen within the interval 0<p<1, preferably 0.5<p<0.9. A comparative evaluation of a large number of computed radiography images of thorax and bones by a team of radiologists indicated that p=0.7 is the optimal value in most cases, m specifies the abscissa range: 0≦x≦m, e.g. m=4095 if the average wavelet maximum is represented by 12 bits. This control function is implemented in the above mentioned lookup table 62.

A plot of the above function is presented in FIG. 7a. When all wavelet coefficients in a cluster are multiplied with the associated amplification factor, then the image primitives with low amplitude will be boosted relative to the image primitives that originally had good contrast. Because of the constant amplification factor for each coefficient in a cluster, the global shape of the corresponding image primitive will not be altered. In this respect the above power function proved to perform very well, but it is clear that an infinite variety of monotonically decreasing control functions can be found that will enhance subtle details.

In an alternative embodiment excessive noise amplification can be avoided by using a composite control function:

$$af=(m/x)*(c/m)^q*(x/c)^p \text{ if } 0 \leq x < c$$

$$af=(x/m)^{q-1} \text{ if } c \leq x \leq m$$

where x is the average wavelet maximum of the cluster and the power q is chosen within the interval 0<q<1, preferably 0.5<q<0.9, and most preferably q=0.7 (however the preferred value of q depends upon the kind of radiological examination), where the power p is not smaller than q, where the cross-over abscissa c specifies the transition point between both power functions: 0<c<m, and preferably c is very small relative to m; and where m specifies the abscissa range: 0≦x≦m.

A plot of the above function is presented in FIG. 7b. Decreasing the power q will further enhance the contrast of subtle details, but at the same time the noise component will also be amplified. The noise amplification can be limited by choosing a power value p larger than q, preferably 1.0, so, that the slope of the control function is not extremely steep for the range of very small abscissae in the interval 0 . . . c. Ideally, the cross-over abscissa c should be proportional to the standard deviation of the noise component (assuming additive noise), with a proportionality factor between one and two. In that case the lowest amplitude details buried within the noise along with the majority of the noise signals will only be moderately amplified.

In this respect the above composite power function proved to perform very well, but it is clear that an infinite variety of monotonically decreasing control functions can be found that will enhance subtle details without boosting the noise to an excessive level. The main requirement is that the slope of said control function is steeper in the subrange of argument values that correspond to small image primitive amplitudes than it is either in the subrange of very small argument values, which correspond to noise, or in the range of the larger image primitives amplitudes.

When the coefficients in each cluster are modified according to one of the above methods, and next used as input data in the reconstruction section, then the dynamic range of the resulting signal will normally exceed the original range. Therefore the resulting image signal is ultimately reduced to the dynamic range of the original signal, or even smaller. In the former case the contrast of subtle details will show improved perceptibility in comparison with the original image, in the latter case the same perceptibility level may be reached with a smaller dynamic range, in accordance with the findings of the present invention. In a preferred embodiment the above reduction of dynamic range is accomplished by means of a lookup table, which maps said reconstructed image signal to an output signal that represents the desired screen brightness or film density. The mapping is monotonic and may be linear or curved, depending on the desired gradation.

The reconstruction process corresponding to the second embodiment of the decomposition process is the inverse wavelet transform depicted in figure taking the modified wavelet coefficients as the input images $W_{hi}$ and $W_{vi}$ and the unmodified low resolution approximation 31'.

Figure 10A:
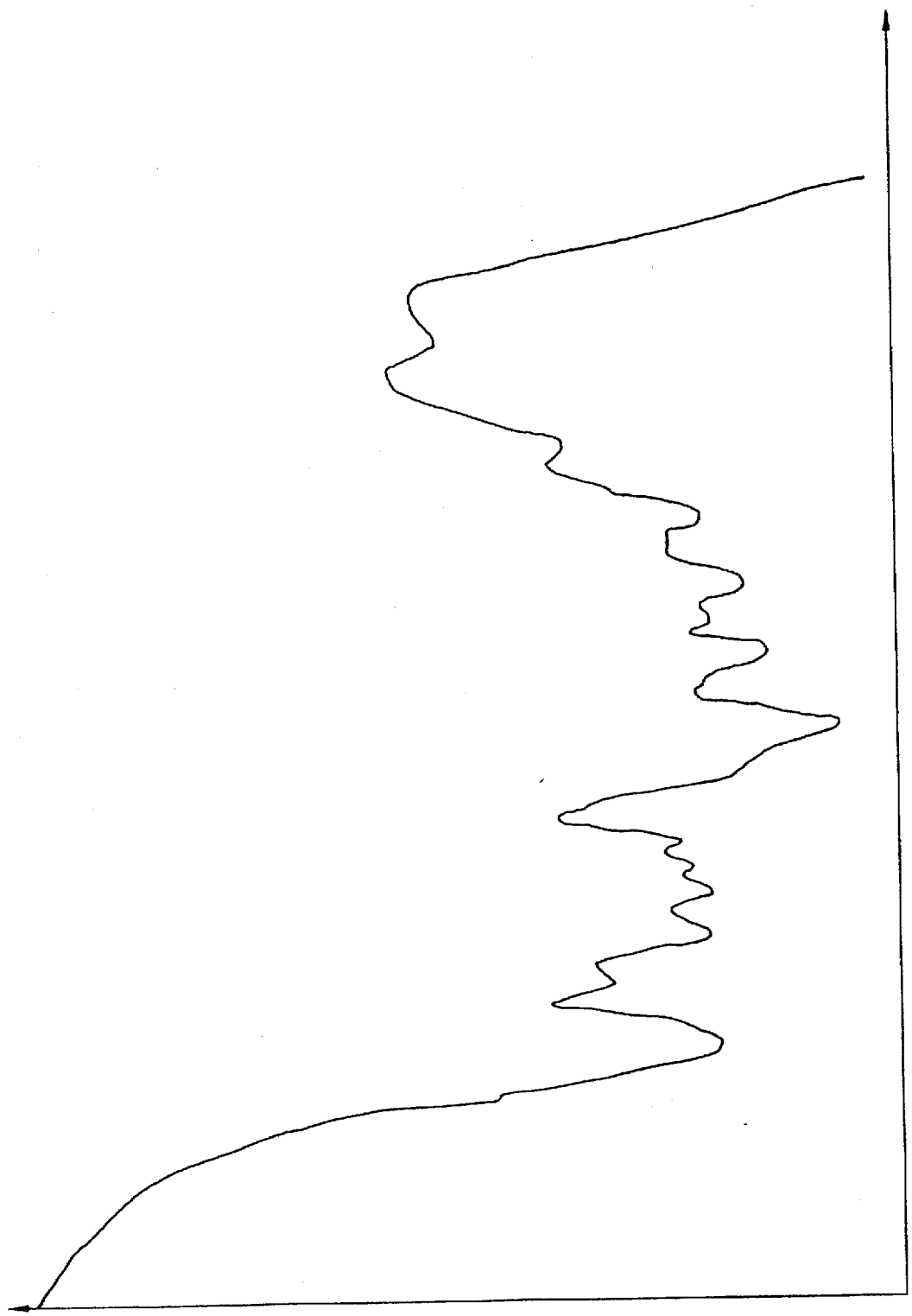
FIG. 10a is a plot of one line of an original image.
Figure 10B:
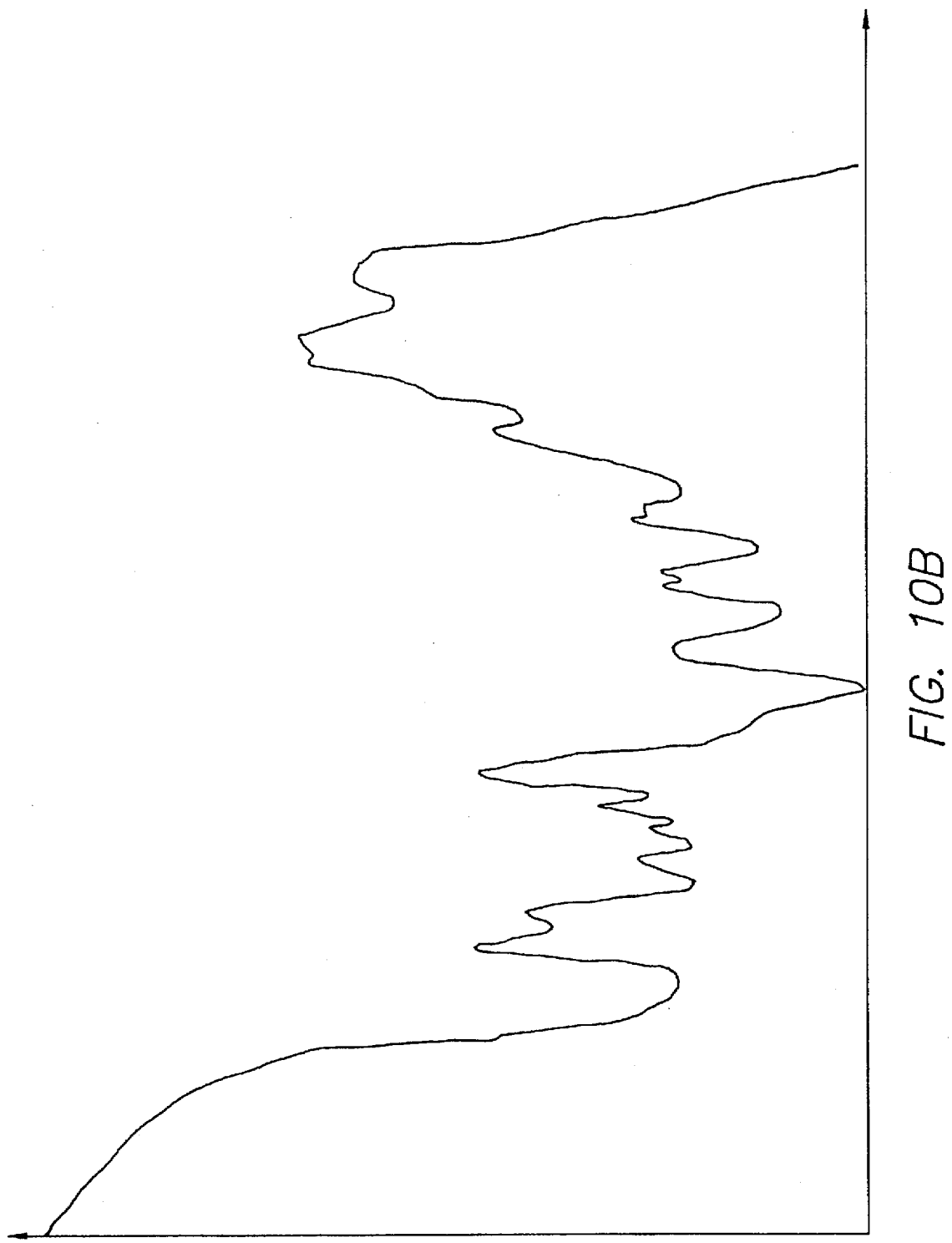
FIG. 10b is a plot of the corresponding line of a contrast enhanced image.

As an example FIG. 10a depicts a single line of an original image 2, and FIG. 10b the corresponding line of a resulting image 4 enhanced according to the second embodiment of decomposition and reconstruction, and the second embodiment of detail modification. Apparently subtle details have been boosted relative to signal variations of high amplitude, without increasing the overall dynamic range, and without creating overshoots or other artifacts in the vicinity of steep edges, in accordance with the findings of the present invention.

Although particular embodiments of this invention have been explained starting from an image representation of an X-ray image that was stored in a photostimulable phosphor screen, it will be clear that this is not limitative of the present invention and that the invention is applicable to other kinds of images.

We claim:

1. A method of enhancing the contrast of an original image by processing said image in a digital computer, said processing comprising the steps of 1) transforming the original image into a multi-resolution edge representation comprising wavelet maxima at multiple resolution levels and a residual image, each wavelet maximum being associated with an edge in the original image, and having a value that is proportional to the maximal edge slope at a specific resolution level and the residual image being an approximation of the original image at a low resolution level, 2) for each wavelet maximum at the highest of said resolution levels determining a wavelet maxima curve comprising wavelet maxima at subsequent lower resolution levels that correspond to the same edge in the original image, 3) modifying the wavelet maxima of each wavelet maxima curve by multiplying said wavelet maxima with a factor 'af' that depends on the average value of the values of the wavelet maxima of said wavelet maxima curve, said dependence being such that if a wavelet maxima curve with larger average wavelet maximum yields a factor $af_1$, and a wavelet maxima curve with smaller average wavelet maximum yields a factor $af_2$, then $af_1 \leq af_2$ 4) computing a processed image by applying an inverse procedure to the residual image and the modified wavelet maxima, the inverse procedure being such that if it is applied to the residual image and the unmodified wavelet maxima, then the original image or a close approximation thereof will result.

2. A method according to claim 1 wherein said multiresolution edge representation is obtained by 1) decomposing the original image into a weighted sum of wavelet basis functions at multiple resolution levels and in multiple directions and a residual image so as to yield wavelet coefficients and a residual image, each wavelet coefficient being proportional to the edge slope in a specific direction determined at a specific resolution level, and the residual image being an approximation of the original image at a low resolution level, 2) for each resolution level determining wavelet maxima as the locations in the multiresolution edge representation where the modulus of the corresponding wavelet coefficients is locally maximal.

3. A method according to claim 2 wherein said decomposition is performed by:

1) applying one-dimensional high-pass filters independently to the rows and the columns of the original image and applying a two-dimensional low-pass filter to the original image, the former filters yielding horizontal and vertical wavelet coefficients respectively at the highest resolution level, and the latter filter yielding an approximation of the original image at the highest of said resolution levels, 2) identifying the above operations as the first step of an iteration loop, and performing additional iterations using an approximation image resulting from the previous iteration instead of the original image, where the pass-through frequency of the high-pass filters and the cut-off frequency of the low-pass filter are reduced at each iteration, yielding wavelet coefficients and an approximation of the original image at subsequent lower resolution levels and wherein said residual image is the result of the low-pass filter after the last iteration.

4. A method according to claim 3 wherein said reduction of pass-through frequencies at each iteration is performed by a factor of two.

5. A method according to claim 4 wherein the filter coefficients used in the first iteration are (−2, 2) for the high-pass filters, and ((1/64, 3/64, 3/64, 1/64), (3/64, 9/64, 9/64, 3/64), (3/64, 9/64, 9/64, 3/64), (1/64, 3/64, 3/64, 1/64)) for the low-pass filter and all coefficients are multiplied by a correction factor, and wherein the filters in the subsequent iterations are obtained by using the above values multiplied by a correction factor, and by inserting 0-valued coefficients every other tap position horizontally, vertically, or both, respectively at each iteration,. said correction factor being equal to 0.66 for the first iteration, 0.89, 0.97, 0.99 for the second through the fourth iteration, and 1 for the subsequent iterations.

6. A method according to claim 2 wherein said wavelet maxima curves comprise connected wavelet maxima, each wavelet maxima curve being determined by 1) iterating the following procedure, starting at the second highest resolution level i=1, down to the lowest resolution level i=L:
   i) for each wavelet maximum at the current resolution level i, centering a rectangular neighbourhood box at the corresponding location at the higher resolution level i−1, oriented either horizontally or vertically according to the principal direction of the wavelet coefficients
   ii) in each such neighbourhood box selecting the largest wavelet maximum for which the vector angle of the corresponding wavelet coefficients is equal up to some tolerance to the vector angle of said wavelet maximum at the current resolution level i
   iii) if such largest wavelet maximum at the higher resolution level i−1 has been selected, appending said wavelet maximum at the current resolution level i to a list of candidates for connection associated with said selected wavelet maximum
   iv) after having performed steps i) through iii) for all wavelet maxima at the current resolution level i, establishing a connection between each wavelet maximum at the higher resolution level i−1 and the largest wavelet maximum at the current resolution level i that has been appended to said list of candidates associated with said wavelet maximum at the higher resolution level i−1, 2) for each wavelet maximum at the highest resolution level, i=0, associating a wavelet maxima curve, and including said wavelet maximum at the highest resolution level and all its subsequently connected wavelet maxima at lower resolution levels in said wavelet maxima curve.

7. A method according to claim 1 wherein said factor is equal to $af=(x/m)^{p-1}$, wherein x is the average of the wavelet maxima of said wavelet maxima curve, and m specifies the range of applicable abscissa values: $0 \leq x \leq m$, and p is a parameter in the range $0 < p < 1$.

8. A method according to claim 1 wherein said factor is equal to:

$$af=(m/x)^*(c/m)^{q*}(x/c)^p, \text{ if } 0 \leq x < c,$$

$$af=(x/m)^{q-1} \text{ if } c \leq x \leq m,$$

wherein x is the average of the wavelet maxima of said wavelet maxima curve, wherein m specifies the range of applicable abscissa values:

$0 \leq x \leq m$, and the cross-over parameter c is in the range $0 < c < m$, and wherein p and q are parameters such that $0 < q < 1$ and $p \leq q$.

9. A method of enhancing the contrast of an original image by processing said image in a digital computer, said processing comprising the steps of
   1) transforming the original image into a multiresolution edge representation, comprising wavelet coefficients at multiple resolution levels and in multiple directions and a residual image, each wavelet coefficient being associated with an edge pixel in the original image, and having a value that is proportional to the edge slope in a specific direction determined at a specific resolution level and the residual image being an approximation of the original image at a low resolution level,
   2) for each resolution level determining wavelet maxima as the locations in the multiresolution edge representation where the modulus of the corresponding wavelet coefficients is locally maximal,
   3) for each wavelet maximum at the highest of said resolution levels determining an initial wavelet maxima cluster, said initial wavelet maxima cluster comprising wavelet maxima at subsequent lower resolution levels, that correspond to the same edge in the original image,
   4) extending said initial wavelet maxima clusters at each resolution level by assigning each location of said multiresolution edge representation to an initial wavelet maxima cluster,
   5) modifying the wavelet coefficients of said multiresolution edge representation by multiplication with a factor 'af' which depends on the average of the wavelet maxima of the corresponding wavelet maxima cluster, wherein the dependence is such that if a wavelet maxima cluster with larger average wavelet maximum yields a factor $af_1$, and a wavelet maxima cluster with smaller average wavelet maximum yields a factor $af_2$, then $af_1 \leq af_2$,
   6) computing the processed image by applying an inverse transform to the residual image and the modified wavelet coefficients, the inverse transform being such that if it is applied to the residual image and the unmodified wavelet coefficients, then the original image or a close approximation thereof will result.

10. A method according to claim 9 wherein said transformation is performed by
    1) applying one-dimensional high-pass filters independently to the rows and the columns of the original image and a two-dimensional low-pass filter to the original image, the former filters yielding horizontal and vertical wavelet coefficients respectively at the highest resolution level, and the latter filter yielding an approximation of the original image at the highest resolution level,
    2) identifying the above operations as the first step of an iteration loop, and performing additional iterations using the approximation image resulting from the previous iteration instead of the original image, where the pass-through frequency of the high-pass filters and the cut-off frequency of the low-pass filter are reduced at each iteration, yielding wavelet coefficients and an approximation of the original image at subsequent lower resolution levels,
  and wherein said residual image is the result of the low-pass filter after the last iteration.

11. A method according to claim 10 wherein said reduction of pass-through frequency and cut-off frequency at each iteration is performed by a factor of two.

12. A method according to claim 11 wherein the filter coefficients used in the first iteration are (−2, 2) for the high-pass filters, and ((1/64, 3/64, 3/64, 1/64), (3/64, 9/64, 9/64, 3/64), (3/64, 9/64, 9/64, 3/64), (1/64, 3/64, 3/64, 1/64)) for the low-pass filter, all coefficients are multiplied by a correction factor, and wherein the filters in the subsequent iterations are obtained by using the above values multiplied by a correction factor, and by inserting 0-valued coefficients every other tap position horizontally, vertically, or both, respectively at each iteration, said correction factor being equal to 0.66 for the first iteration, 0.89, 0.97, 0.99 for the second through the fourth iteration, and 1 for the subsequent iterations.

13. A method according to claim 9 wherein said wavelet maxima clusters initially comprise connected wavelet maxima, each initial wavelet maxima cluster being determined by
    1) iterating the following procedure, starting at the second highest resolution level i=1, down to the lowest resolution level i=L:
       i) for each wavelet maximum at the current resolution level i, centering a rectangular neighbourhood box at the corresponding location at the higher resolution level i−1, oriented either horizontally or vertically according to the principal direction of the wavelet coefficients,
       ii) in each such neighbourhood box selecting the largest wavelet maximum for which the vector angle of the corresponding wavelet coefficients is equal up to some tolerance to the vector angle of said wavelet maximum at the current resolution level i,
       iii) if such largest wavelet maximum at the higher resolution level i−1 has been selected, appending said wavelet maximum at the current resolution level i to a list of candidates for connection associated with said selected wavelet maximum,
       iv) after having performed steps i) through iii) for all wavelet maxima at the current resolution level i, establishing a connection between each wavelet maximum at the higher resolution level i−1 and the largest wavelet maximum at the current resolution level i that has been appended to said list of candidates associated with said wavelet maximum at the higher resolution level i−1,
    2) for each wavelet maximum at the highest resolution level, i=0, associating an initial wavelet maxima cluster, and including said wavelet maximum at the highest resolution level and all its subsequently connected wavelet maxima at lower resolution levels in said initial wavelet maxima cluster.

14. A method according to claim 9 wherein said initial wavelet maxima clusters are extended by
    1) at each resolution level for each initial wavelet maxima cluster determining at each location of said multiresolution edge representation a field strength generated by said initial wavelet maxima cluster according to $E = L_{wave}/(r-1)$, wherein $L_{wave}$ is the number of wavelet maxima in said initial wavelet maxima cluster,
  and wherein r is the distance from said location to the location of the corresponding wavelet maximum at said resolution level included in said initial wavelet maxima cluster,
    2) at each resolution level assigning each location of said multiresolution edge representation to that initial wavelet maxima cluster which generates the largest field strength at said resolution level and location.

15. A method according to claim 9 wherein said factor is equal to $af = (x/m)^{p-1}$, wherein x is the average of the wavelet maxima of said initial wavelet maxima cluster, wherein m specifies the range of applicable abscissa values: $0 \leq x \leq m$, and wherein p is a parameter in the range $0<p<1$.

16. A method according to claim 9 wherein said factor is equal to:

$$af=(m/x)*(c/m)^q*(x/c)^p, \text{ if } 0 \leq x < c,$$

$$af=(x/m)^{q-1} \text{ if } c \leq x \leq m,$$

wherein x is the average of the wavelet maxima of said initial wavelet maxima cluster, wherein m specifies the range of applicable abscissa values: $0 \leq x \leq m$, and the crossover parameter c is in the range $0<c<m$, and p and q are parameters such that $0<q<1$ and $p<q$.

17. A method according to claim 1 wherein said original image obtained by scanning a photostimulable phosphor screen that had been exposed to X-radiation by means of stimulating radiation, detecting light emitted upon stimulation and converting said light into an electric representation.

* * * * *